July 16, 1968 W. G. KORFF 3,392,658
DAMPER OPERATING MEANS
Filed Feb. 23, 1967
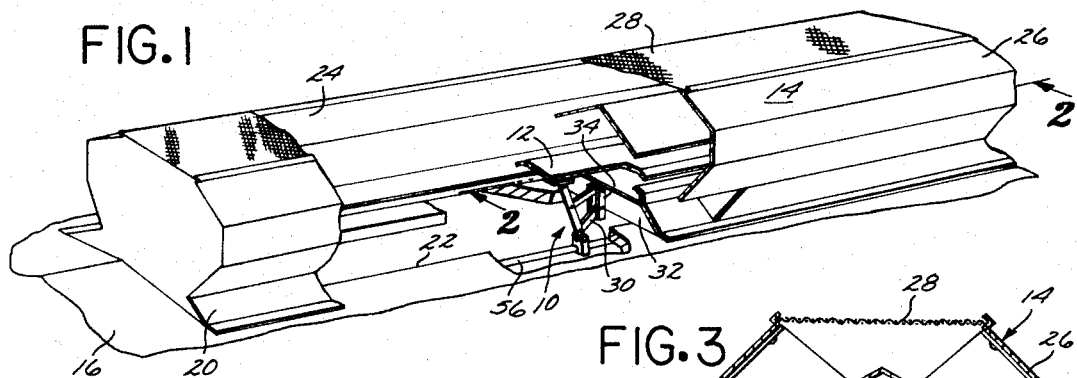
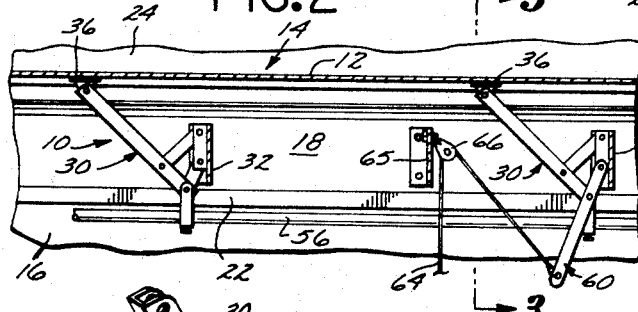
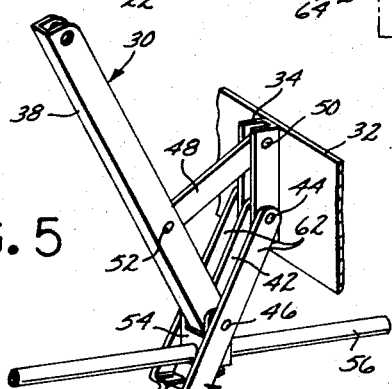
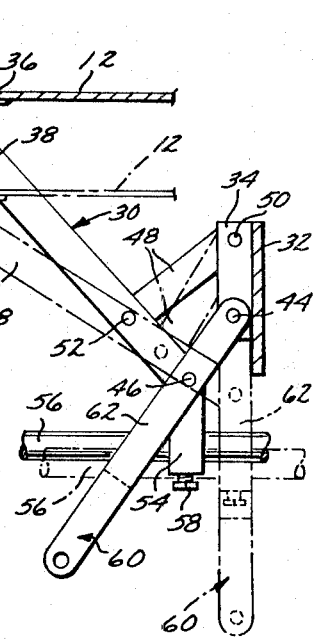
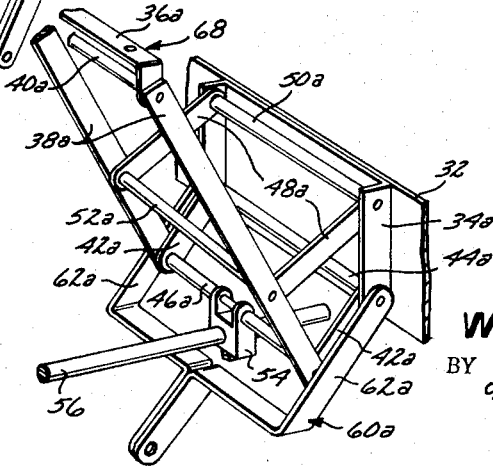
INVENTOR.
WOLFRAM G. KORFF
BY Fulwider, Patton, Rieber,
Lee and Utecht
ATTORNEYS

United States Patent Office 3,392,658
Patented July 16, 1968

3,392,658
DAMPER OPERATING MEANS
Wolfram G. Korff, Granada Hills, Calif., assignor to Western Engineering & Mfg. Co., Los Angeles, Calif., a corporation of California
Filed Feb. 23, 1967, Ser. No. 617,938
5 Claims. (Cl. 98—42)

ABSTRACT OF THE DISCLOSURE

A damper operating means for the damper of a ventilator adapted to be mounted upon the roof of a building over an elongated opening in the roof, the operating means including a plurality of operator linkages spaced along the length of the damper and operative to raise and lower the damper along a substantially vertical and straight path.

BACKGROUND OF THE INVENTION

Field of the invention

The present invention relates generally to the field of damper operating mechanisms for elongated dampers of ventilators of that type designed for mounting over an elongated ventilating opening in the roof of a building or the like. The invention particularly relates to a damper operating means which includes a plurality of damper operator linkages adapted to be spaced along the damper and pivotally connected to the damper and to adjacent fixed structure, and which are operative to guide the damper in a substantially vertical and straight path during its travel between open and closed positions.

Description of the prior art

Prior art damper operating mechanisms of the linkage type are generally operative to raise the damper pivotally, so that the damper travels not only vertically but also longitudinally. Consequently, the ventilator casing must be made longer solely to accommodate this longitudinal travel. Other known mechanisms of the prior art achieve a desired vertical and straight damper travel by means of chains or the like, from which the damper is suspended. However, the damper is then undesirably subject to end travel and side sway, which is noisy and conducive to misalignment upon closure. Attempts to cure the objectionable end travel and side sway have generally involved end guides, or pin-and-slot guide arrangements and the like, which provide a track or path which the damper must follow. Obviously, these arrangements are characterized by friction, which produces undesirable drag, screeching of scraping metal parts, and susceptibility to jamming.

SUMMARY OF THE INVENTION

According to the present invention, the elongated damper of a ventilator for a building roof or the like is actuable by a damper operating means characterized by a plurality of damper operator linkages spaced along the length of the damper for interconnection between the damper and support structure fixed to the casing. Each operator linkage comprises a primary linkage for pivotal coupling at one extremity to the damper, and a pair of other linkages pivotally coupling the primary linkage to the casing in such a way that the damper extremity of the primary linkage is guided or constrained to move in a substantially vertical and straight path. The use of linkages instead of chains or the like to support the damper greatly reduces any tendency of the damper to move endwise, sway sideways, or flutter under the influence of differential pressure across the damper.

An object of the invention is to provide damper operating means of the aforementioned character which are adapted for association with many existing ventilator structures to thereby up-date and improve the damper actuation properties of such structures.

Another object of the invention is the provision of such a damper operating means which can be actuated by conventional mechanisms of the prior art, such as pull chains or motor driven pull lines and the like.

Yet another object of the invention is to provide such a damper operating means in which the component parts are readily accessible for adjustment, servicing, and replacement when necessary.

Other objects and features of the invention will become apparent from consideration of the following description taken in connection with the accompanying drawings.

BRIEF DESCRIPTION OF THE DRAWING

FIG. 1 is a perspective view of the damper operating means of the present invention illustrated in association with a ridge ventilator mounted on the roof ridge of a building over an elongated opening in the roof;

FIG. 2 is an enlarged view taken along the line 2—2 of FIG. 1;

FIG. 3 is an enlarged view taken along the line 3—3 of FIG. 2;

FIG. 4 is an enlarged side elevational view of one of the damper operator linkages of the invention, and particularly illustrating the positions of the linkage components when the damper is in its open and closed positions;

FIG. 5 is a perspective view of the damper operating means illustrated in FIGS 1 through 4; and FIG. 6 is a perspective view of a second embodiment of the present damper operating means.

DESCRIPTION OF THE PREFERRED EMBODIMENTS

Referring now to the drawings, and particularly to FIGS. 1 through 5, there is illustrated a damper operating means 10 for operation of an elongated damper 12 which is part of a ridge ventilator having a casing 14 mounted upon the roof 16 of a building or the like.

Although the damper operating means 10 is adapted for use in conjunction with various types of ventilator, the ventilator illustrated is typical. In this regard, the ventilator casing 14 comprises throat flashing structure having a pair of opposed flashing sections 18 and 20 coextensive with the damper 12 and secured to the roof 16 on opposite sides of a roof opening 22 from which air is to be vented. The upper extremities of the flashing sections 18 and 20 define a throat through which air from the interior of the building passes, and also provide a seat for the side edges of the damper 12. As is well known, the structure of the damper and flashing is such that when the damper is resting upon the flashing sections 18 and 20, the damper 12 is in a closed position blocking the flow of air from the building. When the damper 12 is raised above and in spaced relation to the adjacent edges of the flashing sections 18 and 20, the damper 12 is in its open position, permitting air to flow around and upwardly of the side edges of the damper 12.

With the damper 12 in its open position, air exhausting from the building interior is guided around and upwardly of the damper 12 by a pair of elongated wind bands 24 and 26 which are secured along their lower extremities to the flashing sections 18 and 20, respectively. The upper extremities of the wind bands 24 and 26 are bent to form grooves for slidably receiving a protective screen 28.

The foregoing details of the ventilator 14 are set forth merely to clarify the operative environment of the damper operating means 10, the present invention being concerned primarily with the operation of the damper 12 between its open and closed positions.

The damper operating means 10 comprises, generally, a plurality of damper operator linkages 30 which are arranged at spaced intervals along the length of the damper. The linkages 30 are secured, respectively, to a plurality of transversely oriented throat spacers or supports 32 whose opposite extremities are rigidly secured to the opposed flashing sections 18 and 20 of the casing 14 in any suitable fashion, the supports 32 being arranged in longitudinally spaced relation along the length of the damper 12.

Each support 32 spans the throat defined by the flashing sections 18 and 20 above the roof opening 22, and each support 32 includes a vertically oriented and centrally located channel 34 to which, as will be seen, certain elements of each linkage 30 are pivotally connected. Other elements of each linkage 30 are pivotally connected to a damper bracket 36 which is fixed to the damper 12 and has a depending portion to effect pivotal connection with the linkage 30.

Each of the damper operator linkages 30 includes an elongated primary pivot arm or linkage 38 having a channel cross-section. The upper or outer extremity of the primary linkage 38 is pivoted to the depending portion of the damper bracket 36 by a pin 40.

Each linkage 30 also includes an elongated secondary pivot arm or linkage 42 whose upper or inner extremity extends within the channel space at the lower extremity of the support channel 34, being pivotally connected to the support channel 34 by a pin 44. The other extremity of the secondary linkage 42 extends into the channel space at the lower extremity of the primary linkage 38 and is pivotally connected in this position by a pin 46.

Each linkage 30 also includes an elongated pivot arm or guide arm linkage 48 whose opposite extremities extend into the channel spaces of the primary linkage 38 and the support channel 34, the guide arm linkage 48 being pivotally secured to the upper extremity of the support channel 34 by a pin 50. The linkage 48 is also pivotally secured to the primary linkage 38 by a pin 52, it being noted that the pin 52 is located between the pivot axes of the pins 40 and 46 which are located at the opposite extremities of the primary linkage 38.

A linkage bar lug 54 is located at the lower extremity of each of the primary linkages 38, and includes a pair of legs which straddle the opposite sides of the linkage 38 and accept a pin 46 which pivotally secures the lug 54 to the linkage 38. Each lug 54 includes a longitudinally oriented opening through which is disposed an elongated coupling element or rod 56, the rod 56 extending through each of the lugs 54 so that pivotal movement of any one of the primary linkages 38 is transmitted to the other of the linkages 38. Each lug 54 also includes a set screw 58 which can be tightened to engage the rod 56 and fix the lug 54 in position upon the rod 56.

As best viewed in FIG. 5, at least one of the damper operator linkages 30 includes an elongated operator arm 60 having a pair of arms 62 whose upper extremities straddle the support channel 34, being pivotally secured to the channel 34 by the pin 44. The spaced apart arms 62 extend below the rod 56 and are joined at their lower extremities by any suitable means, such as by spot welding or the like. In addition, the arms 62 straddle the lug 54, being pivotally secured to the lug 54 and the lower extremity of the primary linkage 38 by the pin 46. The space between the arms 62 of the operator 60 permits the operator 60 to swing or pivot freely past the lug 54 and the depending set screw 58 thereof.

The operator 60 is pivoted by a pull cord or chain 64 which is attached to the lower extremity of the operator 60. The chain 64 is trained over a pulley 66 which is mounted to a throat spacer or support 65 which is identical to the supports 32. From the pulley 66 the pull chain 64 extends downwardly for operation from the interior of the building, as is well known to those skilled in the art.

The damper 12 is raised by pulling upon the chain 64, which pivots the operator arm 60 in a clockwise direction, as viewed in FIG. 3, the pivoting operator 60 carrying with it the secondary linkage 42, which pivots the primary linkage 38 to raise the damper 12.

During this pivotal movement of the primary linkage 38, the secondary linkage 42 and the guide arm linkage 48 dictate the path which is followed by the primary linkage 38 so that the upper or outer extremity of the primary linkage tends to move in a substantially vertical and straight path. Consequently, the damper 12 is raised in a corresponding substantially vertical and straight path without objectional longitudinal travel.

In one suitable embodiment of the damper operator linkage 30, a straight vertical travel of approximately 6 inches was achieved with a linkage structure having the following dimensions, the dimensions being measured between pivot points: channel 34—3⅛"; secondary linkage 42—2¹¹⁄₁₆"; guide arm linkage 48—4⁵⁄₁₆"; primary linkage 38—8¾"; and distance between pins 46 and 52—3¾". If a longer substantially straight vertical path for the damper 12 is desired, the foregoing dimensions need only be adjusted accordingly.

Referring now to FIG. 6, there is illustrated another embodiment of the present invention, which is designated generally by the numeral 68. Components thereof which correspond to the components of the first embodiment are identified by the subscript "a."

The damper operating means 68 comprises a damper support 32a which extends between and is connected to the opposed flashing sections 18 and 20. The support 32a includes a relatively wide channel 34a which carries a pair of elongated pivot rods 50a and 44a at its upper and lower extremities, respectively.

The opposite extremities of the pivot rod 50a pivotally carry the inner extremities of a pair of arms 48a of a guide arm linkage, the opposite extremities of the arms 48a being pivotally carried by a transversely oriented pivot rod 52a. The opposite extremities of the pivot rod 52a mount a pair of elongated primary linkage arms 38a for pivotal movement about an axis located between the opposite extremities of the arms 38a.

The upper extremities of the primary linkage arms 38a are pivotally carried by the opposite extremities of a pivot rod 40a which is carried by the downturned vertically oriented end flanges of a transversely elongated damper bracket 36a secured to the damper 12. The opposite or lower extremities of the primary linkage arms 38a are pivotally carried by a pivot rod 46a, which also mounts the lug 54 which is fixed to the elongated rod 56.

The opposite extremities of the pivot rod 46a also pivotally carry the lower or outward extremities of a pair of secondary linkage arms 42a, whose opposite extremities are pivotally carried by the pivot rod 44a. In addition, the ends of the pivot rods 44a and 46a extend through the opposite arms 62a of an operator 60a, the lower extremities of the arms 62a being brought together and joined for attachment to the pull chain 64, exactly as previously set forth in connection with the description of the embodiment of FIGS. 1 through 5.

From the foregoing, it is seen that the embodiment of FIG. 6 is substantially identical in operation and function to the embodiment of FIGS. 1 through 5, except that instead of single arms or links pivoted on short pins, the linkages of the second embodiment include pairs of transversely spaced-apart arms which are pivotally mounted on pivot rods. With this arrangement, the embodiment of FIG. 6 is characterized by greater lateral stability and structural rigidity. This is of particular utility where the damper 12 to be operated is relatively wide or heavy in construction. In all functional respects, however, damper operating means 68 operates to raise and lower the damper in a substantially vertical and straight path, just as in the first embodiment.

Thus, the damper operating means of the present invention is operative to raise and lower the damper in a substantially vertical and straight path without longitudinal movement or side sway of the damper. Elimination of longitudinal movement eliminates any necessity for providing additional and waste space at one end of the ventilator to accommodate longitudinal movement of the damper. The absence of side sway insures accurate seating of the damper upon the throat opening defined by the opposed flashing sections. Moreover, the present damper operating means is easily adapted for pull chain operation to open the damper in the manner previously described, and is also adapted to be operated, if desired, by another chain attached to the operator and hanging straight down. A straight downward pull on such a chain would provide positive closure of the damper and locking of the damper in its closed position. The damper would thereby not be subject, for example, to "fluttering" under the influence of slight differential pressures across the damper. Of course, closure springs or the like could also or alternatively be used, if desired, to bias the damper toward its closed position, as will be apparent.

The damper operating means is readily adapted for substitution in ventilator structures of the type above described to replace existing unsatisfactory damper operating means.

Various modifications and changes may be made with regard to the foregoing detailed description without departing from the spirit of the invention or the scope of the following claims.

I claim:

1. A damper operating means for the damper of a ventilator which is characterized by an elongated casing adapted for mounting upon the roof of a building or the like, wherein the casing includes an inlet opening adapted to admit air from the building and an outlet opening adapted to exhaust the air to the atmosphere, and wherein the damper is located in the casing for movement between a closed position overlying said inlet opening and an open position spaced above said inlet opening to permit air to pass about the damper and toward said outlet opening, said damper operating means comprising:

support means including a plurality of supports for securement to the ventilator casing in longitudinally spaced relation along the casing;

a corresponding plurality of damper operator linkages, each including an elongated primary linkage for pivotal coupling at its outer extremity to the damper; an elongated secondary linkage coupled at one extremity to an associated one of said supports for pivotal movement about a first axis, and coupled at its other extremity to the inner extremity of said primary linkage for pivotal movement about a second axis; and an enlongated guide arm linkage coupled at one extremity to said one of said supports for pivotal movement about an axis located above said first axis, and coupled at its other extremity to said primary linkage for pivotal movement about an axis located between the extremities of said primary linkage, the location of the pivot axes of said guide arm linkage and the length of said guide arm linkage between its pivot axes being predetermined to guide the outer extremity of said primary linkage for travel in a substantially vertical and straight path to thereby correspondingly move the damper in a substantially vertical and straight path between the open and closed positions thereof;

and means extending between and coupled to said plurality of damper operator linkages and operative to pivot the primary linkages thereof and thereby move the damper between its open and closed positions.

2. A damper operating means according to claim 1 wherein said guide arm linkage is shorter than said primary linkage, and said secondary linkage is shorter than said guide arm linkage.

3. A damper operating means according to claim 1 wherein said last-mentioned means includes a linkage bar lug coupled to each of said primary linkages for pivotal movement about said second axis; an enlongated coupling element connected to and extending between each said lug whereby pivotal movement of one of said primary linkages is transmitted to the others of said primary linkages; and an operator arm coupled to at least one of said damper operator linkages and operative to pivot the primary linkage thereof.

4. A damper operating means according to claim 3 and including pulley mounting means for securement to the casing; a pulley mounted to said pulley mounting means; and an operating chain connected to said operator arm and trained upwardly and over said pulley, and downwardly through the casing inlet opening for actuation from the interior of the building.

5. A damper operating means according to claim 1 wherein each of said primary, secondary and guide arm linkages includes a pair of transversely spaced apart arms, and wherein each of said pivotal axes is defined by a transverse shaft having extremities mounting the associated pair of said arms of said linkages for pivotal movement whereby the damper is characterized by improved lateral stability during movement thereof between its open and closed positions.

References Cited

UNITED STATES PATENTS 2,127,099  8/1938  Whitaker _____ 98—42 X
2,231,557  2/1941  Black _____ 98—42

ROBERT A. O'LEARY, *Primary Examiner.*

W. E. WAYNER, *Assistant Examiner.*